(12) United States Patent
Warren et al.

(10) Patent No.: US 10,704,413 B2
(45) Date of Patent: Jul. 7, 2020

(54) SYSTEMS AND METHODS FOR VARIABLE ALIGNMENT AERODYNAMIC PROBES

(71) Applicant: UNITED TECHNOLOGIES CORPORATION, Farmington, CT (US)

(72) Inventors: Eli Cole Warren, Wethersfield, CT (US); Bryan J. Hackett, Newington, CT (US); Adam Swagger, Amston, CT (US); Daniel J. Boudreau, South Windsor, CT (US); Ryan C. Smith, Coventry, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 135 days.

(21) Appl. No.: 16/123,891

(22) Filed: Sep. 6, 2018

(65) Prior Publication Data

US 2020/0080444 A1    Mar. 12, 2020

(51) Int. Cl.
*F01D 21/00* (2006.01)
*G01P 5/165* (2006.01)
*G05D 3/20* (2006.01)

(52) U.S. Cl.
CPC .......... *F01D 21/003* (2013.01); *G01P 5/165* (2013.01); *G05D 3/20* (2013.01); *F05D 2220/32* (2013.01); *F05D 2260/83* (2013.01)

(58) Field of Classification Search
CPC .......... F01D 17/02; F01D 17/06; F01D 17/08; F01D 17/12; F01D 17/14; F01D 17/141; F01D 17/148; F01D 17/16; F01D 17/162; F01D 17/20; F01D 17/24; F01D 9/04; F01D 9/041; F01D 21/003; G01L 7/00; G01L 19/00; G05D 3/20; G01P 5/165; F05D 2220/32; F05D 2260/83
See application file for complete search history.

(56) References Cited

U.S. PATENT DOCUMENTS

| 3,474,669 | A |   | 10/1969 | Carter et al. |
| 4,139,822 | A | * | 2/1979  | Urich ................. G01N 27/9033 324/219 |
| 4,244,222 | A | * | 1/1981  | Hoyer ..................... F01D 17/02 136/230 |
| 4,433,584 | A | * | 2/1984  | Kokoszka ............... G01P 5/175 73/861.66 |

(Continued)

FOREIGN PATENT DOCUMENTS

| DE | 102004016033 | 10/2005 |
| WO | 0167115 | 9/2001 |

OTHER PUBLICATIONS

European Patent Office, European Search Report dated Feb. 6, 2020 in Application No. 19195224.1.

*Primary Examiner* — Igor Kershteyn
(74) *Attorney, Agent, or Firm* — Snell & Wilmer L.L.P.

(57) ABSTRACT

A variable alignment aerodynamic probe may comprise a probe body having a leading edge and extending radially into a vane case, a sensor element proximate the leading edge, and a bearing coupled to the probe body and the vane case. The probe body may be configured to rotate in response to a turned flow within the vane case. The rotation of the probe body may be configured to maintain an angle of attack of the leading edge with respect to the turned flow between 0° and 15°.

20 Claims, 7 Drawing Sheets

(56) References Cited

U.S. PATENT DOCUMENTS

| | | | |
|---|---|---|---|
| 7,527,471 B2 * | 5/2009 | Schilling | F01D 17/162 29/889.2 |
| 8,397,565 B1 | 3/2013 | Dillon et al. | |
| 9,297,720 B2 * | 3/2016 | Agoos | G01M 15/14 |
| 2015/0369136 A1 * | 12/2015 | Karpman | F02C 9/16 700/275 |
| 2017/0138216 A1 * | 5/2017 | Giordan | G01P 5/14 |
| 2017/0268376 A1 | 9/2017 | Bailey et al. | |
| 2018/0158223 A1 * | 6/2018 | Kobayashi | G02B 23/24 |

\* cited by examiner

SYSTEMS AND METHODS FOR VARIABLE ALIGNMENT AERODYNAMIC PROBES

FIELD

The disclosure relates generally to aerodynamic probe fixtures and more particularly to Kiel probes for gas turbine engines.

BACKGROUND

Aerodynamic probes such as, for example, Pitot tubes and Kiel probes are used to gather gas-path condition information such as pressure and temperature data. Traditional aerodynamic probes tend to gather accurate information within a limited range of probe head orientation with respect to the gas-path flow angle. Generally, condition information is most accurate when the probe head is aligned with the gas-path flow angle, i.e. 0° angle of attack, and begins to degrade as the relative angle increases. In traditional probes, accurate gas-path information may be unobtainable where the probe head angle of attack exceeds 15°.

SUMMARY

In various embodiments the present disclosure provides a variable alignment aerodynamic probe, comprising a probe body having a leading edge and extending radially into a vane case, a sensor element proximate the leading edge, and a bearing coupled to the probe body and the vane case, wherein the probe body is configured to rotate in response to a turned flow within the vane case, wherein the rotation of the probe body is configured to maintain an angle of attack of the leading edge with respect to the turned flow between 0° and 15°.

In various embodiments, the sensor element is at least one of a Pitot tube or Kiel probe. In various embodiments, the probe body further comprises a first shaft coupled to the probe body and rigidly coupled to a first control arm. In various embodiments, the first control arm is coupled to a first end of a control linkage, wherein the control linkage is coupled at a second end to a second control arm. In various embodiments, the second control arm is rigidly coupled to one of a second shaft or a synchronization ring, wherein the second control arm is configured to deflect in response to rotation of a variable vane. In various embodiments, the variable alignment aerodynamic probe further comprises a controller, a first sensor in electronic communication with the controller, a second sensor in electronic communication with the controller, a first servomotor in electronic communication with the controller, a tangible, non-transitory memory configured to communicate with the controller, the tangible, non-transitory memory having instructions stored thereon that, in response to execution by the controller, cause the controller to perform operations comprising: receiving, by the controller, a first data from the first sensor and a second data from the second sensor, determining, by the controller, a first angle of attack difference based on the first data and the second data, calculating, by the controller, a first angle of attack response based on the angle of attack difference, wherein the angle of attack response is configured to null the angle of attack difference, and controlling, by the controller, the first servomotor and, in response, rotating the probe body about a first axis. In various embodiments, a second servomotor may be in electronic communication with the controller, and the operations may further comprise: determining, by the controller, a second angle of attack difference based on the first data and the second data, calculating, by the controller, a second angle of attack response based on the second angle of attack difference, wherein the second angle of attack response is configured to null the second angle of attack difference, and controlling, by the controller, the second servomotor and, in response, rotating the probe body about a second axis. In various embodiments, the first sensor is at least one of a Pitot tube, a Kiel probe, a rotary encoder, a yaw sensor, a pitch sensor, or a Rotary Variable Differential Transformer (RVDT). In various embodiments, the probe body comprises one of a yaw sensor, a pitch sensor, or an RVDT.

In various embodiments, the present disclosure provides a gas turbine engine comprising fan section having a fan case, a compressor section having a compressor case, a turbine section having a turbine case, and a variable alignment aerodynamic probe, comprising a probe body having a leading edge and extending radially into a vane case sensor element proximate the leading edge, and a bearing coupled to the probe body and the vane case, wherein the probe body is configured to rotate in response to a turned flow within the vane case, wherein the rotation of the probe body is configured to maintain an angle of attack of the leading edge with respect to the turned flow between 0° and 15°.

In various embodiments, the sensor element is at least one of a Pitot tube or Kiel probe. In various embodiments, the probe body further comprises a first shaft coupled to the probe body and rigidly coupled to a first control arm. In various embodiments, the first control arm is coupled to a first end of a control linkage, wherein the control linkage is coupled at a second end to a second control arm. In various embodiments, the second control arm is rigidly coupled to one of a second shaft or a synchronization ring, wherein the second control arm is configured to deflect in response to rotation of a variable vane. In various embodiments, the variable alignment aerodynamic probe further comprises a controller, a first sensor in electronic communication with the controller, a second sensor in electronic communication with the controller, a first servomotor in electronic communication with the controller, a tangible, non-transitory memory configured to communicate with the controller, the tangible, non-transitory memory having instructions stored thereon that, in response to execution by the controller, cause the controller to perform operations comprising: receiving, by the controller, a first data from the first sensor and a second data from the second sensor, determining, by the controller, a first angle of attack difference based on the first data and the second data, calculating, by the controller, a first angle of attack response based on the angle of attack difference, wherein the angle of attack response is configured to null the angle of attack difference, and controlling, by the controller, the first servomotor and, in response, rotating the probe body about a first axis. In various embodiments, a second servomotor may be in electronic communication with the controller, and the operations may further comprise: determining, by the controller, a second angle of attack difference based on the first data and the second data, calculating, by the controller, a second angle of attack response based on the second angle of attack difference, wherein the second angle of attack response is configured to null the second angle of attack difference, and controlling, by the controller, the second servomotor and, in response, rotating the probe body about a second axis. In various embodiments, the first sensor is at least one of a Pitot tube, a Kiel probe, a rotary encoder, a yaw sensor, a pitch sensor, or a Rotary Variable Differential Transformer (RVDT). In various embodiments, the probe body comprises one of a yaw sensor, a pitch sensor, or an RVDT.

In various embodiments an article of manufacture is provided. The article of manufacture may include a tangible, non-transitory computer-readable storage medium having instructions stored thereon that, in response to execution by a processor, cause the processor to perform operations comprising receiving, by the processor, a first data from a first sensor and a second data from a second sensor, determining, by the processor, a first angle of attack difference based on the first data and the second data, calculating, by the processor, a first angle of attack response based on the angle of attack difference, wherein the angle of attack response is configured to null the angle of attack difference, and controlling, by the processor, a first servomotor and, in response, rotating a probe body about a first axis.

In various embodiments, the article of manufacture may further comprise the operations of determining, by the processor, a second angle of attack difference based on the first data and the second data, calculating, by the processor, a second angle of attack response based on the second angle of attack difference, wherein the second angle of attack response is configured to null the second angle of attack difference, and controlling, by the processor, a second servomotor and, in response, rotating the probe body about a second axis.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
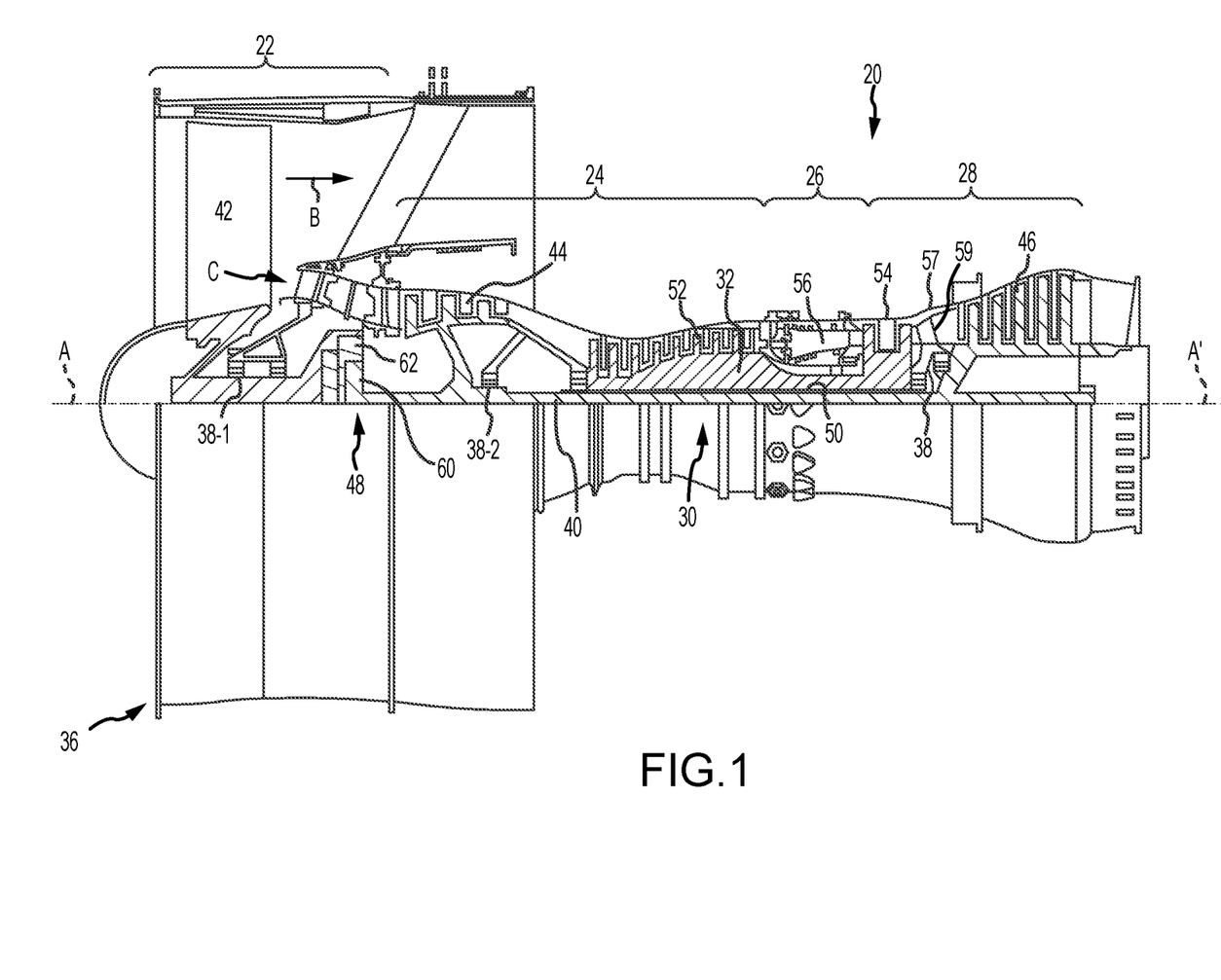
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter). In various embodiments, one or more variable alignment aerodynamic probes as described below may be located within fan section 22, compressor section 24, or turbine section 28.

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2A:
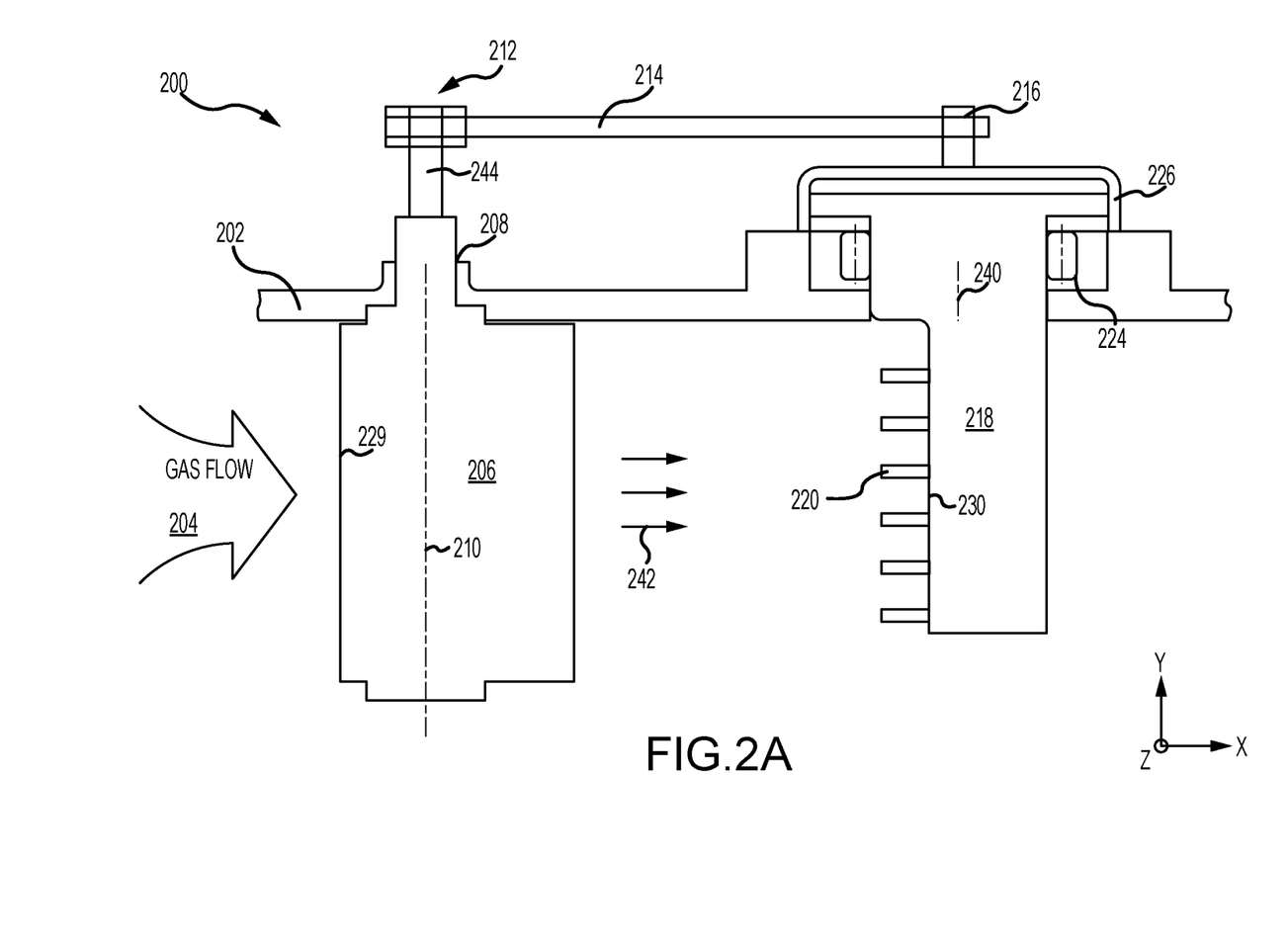
FIG. 2A illustrates a variable alignment aerodynamic probe, in accordance with various embodiments.
Figure 2B:
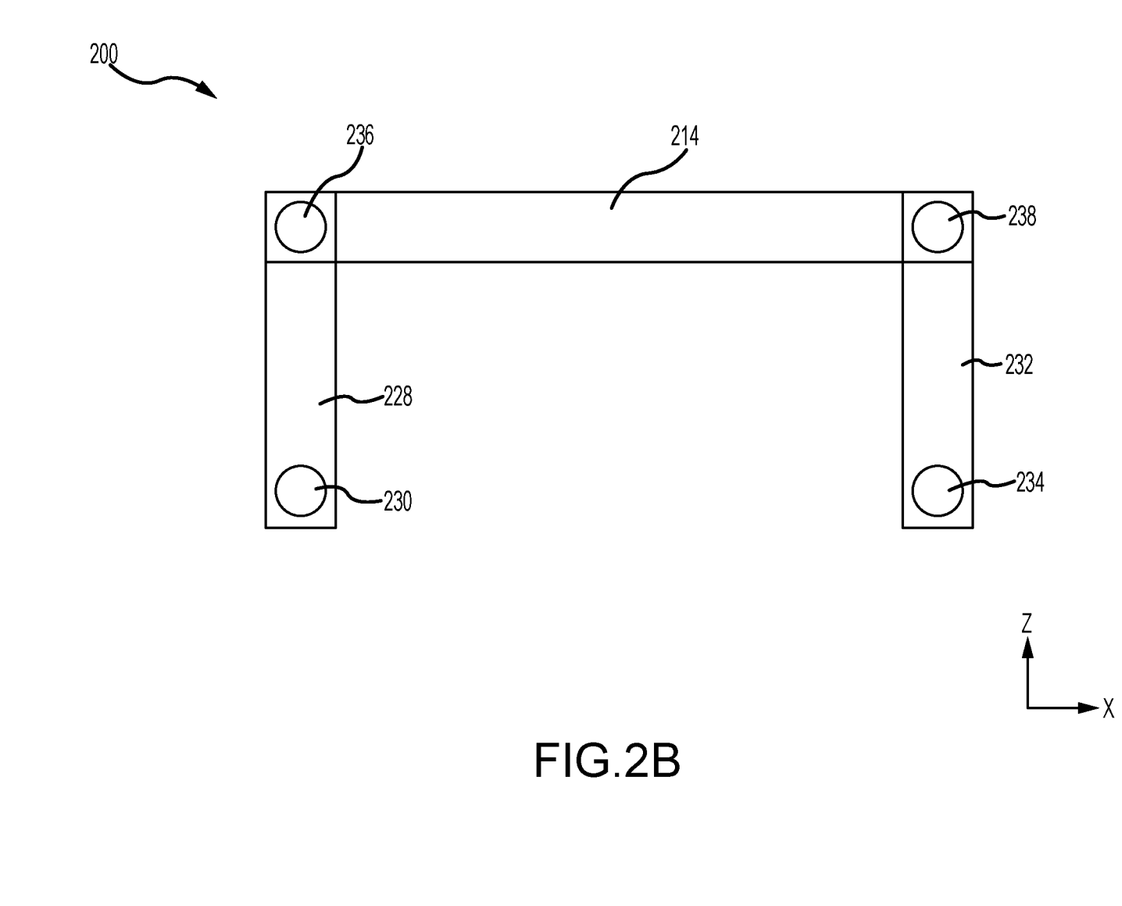
FIG. 2B illustrates control system elements for a variable alignment aerodynamic probe, in accordance with various embodiments.

According to various embodiments and with reference to FIGS. 2A and 2B, a variable alignment aerodynamic probe 200 is illustrated with XYZ-axes provided for reference. Gas flow 204 is constrained within vane case 202 and encounters leading edge 229 of variable vane 206. Probe body 218 extends radially into vane case 202 and lies relatively downstream (along the X-axis) of variable vane 206. In various embodiments, probe body 218 may comprise one or more sensor elements arrayed proximate a leading edge 230 such, for example, a Pitot tube or a Kiel probe. In various embodiments, probe body 218 comprises a plurality of Kielheads 220 extending forward from the leading edge 230 of the probe body 218. Variable vane 206 is coupled to vane case 202 at a first bearing 208 and thereby configured rotate about axis 210. Probe body 218 is coupled to vane case 202 at a second bearing 224 and thereby configured to rotate about axis 240. In this regard, variable vane 206 may adjust the angle of attack of leading edge 230 with regard to gas flow 204 and turn gas flow 204 about the variable vane 206. In various embodiments, variable vane 206 may be coupled at a first shaft 244 to a synchronization ring 212 (i.e. synch ring) which may synchronize the rotation of a plurality of variable vanes.

In various embodiments and with particular reference to FIG. 2B, mechanical control linkages of variable alignment aerodynamic probe 200 are illustrated in the Z-X plane. In various embodiments, the mechanical control linkages of a variable alignment aerodynamic probe may comprise any suitable mechanical, hydro-mechanical, and/or pneumatic linkages such as, for example, pulleys, gearboxes, control arms, pistons, and/or like. In various embodiments, one of the first shaft 244 or the synch ring 212 (FIG. 2A) may be coupled to a first control arm 228 by a rigid coupling 230. First control arm 228 is coupled to control linkage 214 by free bushing 236 at a first end of the control linkage 214. In turn, the control linkage 214 is coupled to a second control arm 232 by free bushing 238 at a second end of the control linkage 214. The second control arm 232 comprises rigid coupling 234 with shaft 216 extending through bearing cover 226 and coupled to probe body 218. In response to rotation of variable vane 206 about axis 210 (i.e., a change in angle of attack with respect to gas flow 204) the first control arm 228 is deflected thereby applying force at the free end of the second control arm 232 via the control linkage 214. In response, the second control arm 232 applies a torque at the shaft 216 thereby rotating the probe body 218 about axis 240. In this regard, the probe body 218 may adjust the angle of attack of leading edge 230 to match the turned flow 242 downstream of variable vane 206. Stated another way, the alignment of Kielheads 220 may be varied with respect to the flow angle of turned flow 242 such that the angle of attack of Kielheads 220 to the turned flow 242 is between 0° and 15°, or between 0° and 10°, or between 0° and 5°.

Figure 3A:
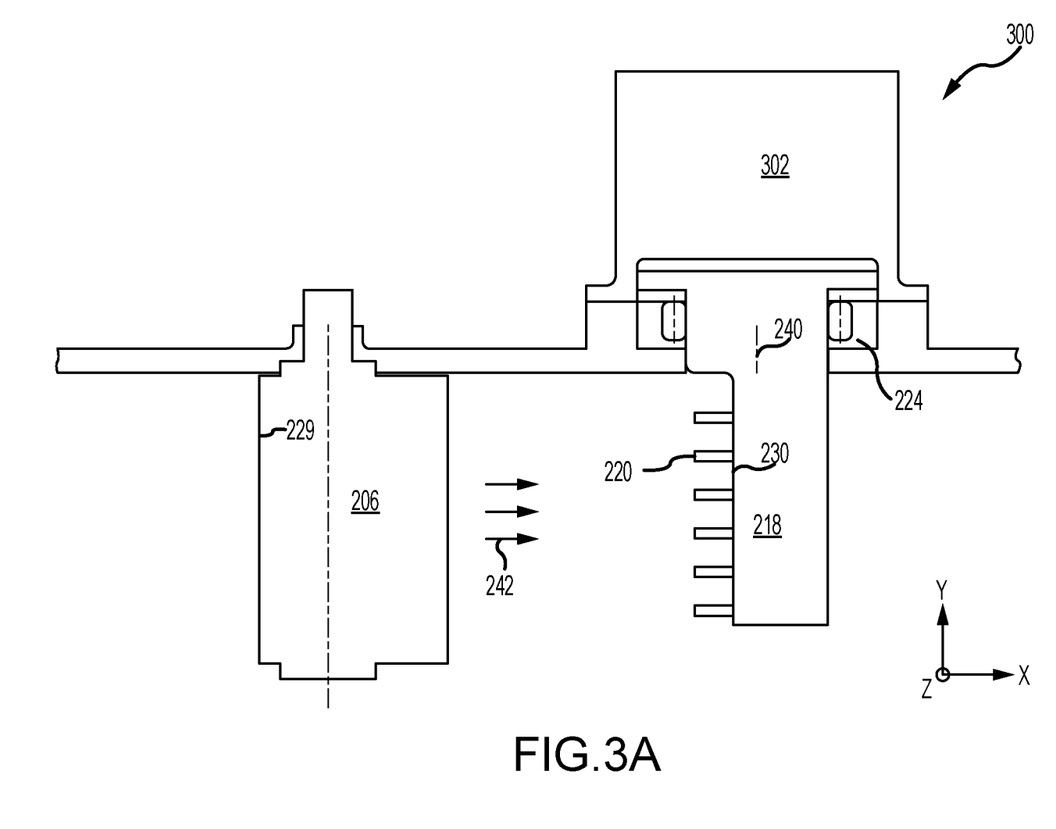
FIG. 3A illustrates a variable alignment aerodynamic probe, in accordance with various embodiments.
Figure 3B:
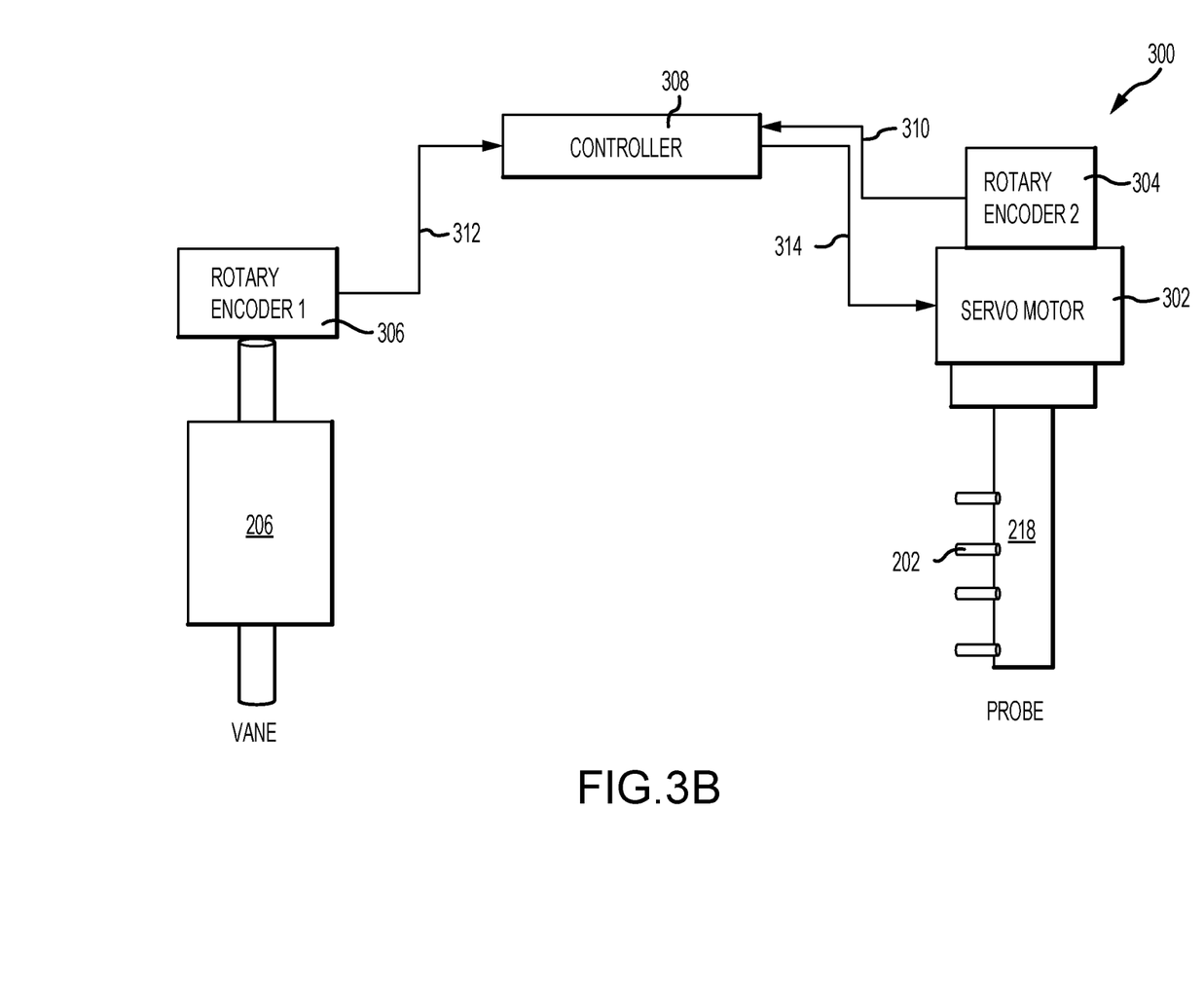
FIG. 3B illustrates control system elements for a variable alignment aerodynamic probe, in accordance with various embodiments.

With reference now to FIGS. 3A and 3B a variable alignment aerodynamic probe 300 is illustrated having features, geometries, construction, materials, manufacturing techniques, and/or internal components similar to variable alignment aerodynamic probe 200. Probe body 218 is coupled to a servomotor 302 which drives probe body 218 to rotate about axis 240. With particular reference to FIG. 3B, a control system for variable alignment aerodynamic probe 300 includes sensors such as a first rotary encoder 306 coupled to variable vane 206 and a second rotary encoder 304 coupled to the servomotor 302. Sensors such as the first rotary encoder 306 and the second rotary encoder 304 may be configured to transmit the measurements to controller 308, thereby providing sensor feedback about the variable alignment aerodynamic probe to controller 308. The sensor feedback may be, for example, a speed signal, or may be position feedback, temperature feedback, pressure feedback or other data. In various embodiments, controller 308 may receive a first angular movement signal 312 from the first rotary encoder 306 and a second angular movement signal 310 from the second rotary encoder 304. In various embodiments, controller 308 may receive aerodynamic data from Kielheads 220.

In various embodiments, controller 308 may be integrated into computer systems onboard an aircraft, such as, for example, a FADEC system controller of gas turbine engine 20. In various embodiments, controller 308 may comprise a processor. In various embodiments, controller 308 may be implemented in a single processor. In various embodiments, controller 308 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 308 may comprise a processor configured to implement various logical operations in response to execution of instructions, for example, instructions stored on a non-transitory, tangible, computer-readable medium configured to communicate with controller 308.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Kielheads 220, servomotor 302, first rotary encoder 306, and second rotary encoder 304 may be in electronic communication with and may be configured to receive electronic data from and/or transmit electronic data to controller 308. Servomotor 302 may be configured to receive control signals 314 from controller 308 and/or be controlled via controller 308. In various embodiments, controller 308 may determine a first angle of attack corresponding to variable vane 206 in response to receiving the first angular movement signal 312. Controller 308 may, via control signals 314, command a first rotation of servomotor 302 which may command the servomotor 302 to rotate to the first angle of attack. In response to the control signals 314, probe body 318 may rotate and controller 308 may determine a second angle of attack corresponding to probe body 318 in response to receiving the second angular movement signal 310. In various embodiments, controller 308 may determine a difference between the first angle of attack and the second angle of attack (i.e., an angle of attack difference). In response to determining the difference between the first angle of attack and the second angle of attack, controller 308 may via control signals 314 command a second rotation of servomotor 302 which may command the servomotor 302 to correct the second angle of attack to match the first angle of attack. In this regard, feedback from the second rotary encoder 304 may tend to provide continuous correction of the probe body angle of attack toward the variable vane 206 angle of attack thereby tending to keep Kielheads 220 within the desired range to gather accurate gas-path condition information such as pressure and temperature data.

In various embodiments, controller 308 may receive Kilehead data, such as pressures and temperatures, from Kielheads 220. Controller 308 may determine the first angle of attack based on the Kielhead data. Controller 308 may calculate an angle of attack response based on the angle of attack difference configured to null the angle of attack difference. Controller 308 may command the servomotor 302 based on the angle of attack response. In this regard, feedback from Kielheads 220 and the second rotary encoder 304 may tend to provide continuous correction of the probe body angle of attack toward the flow angle of the turned flow 242. In various embodiments, control signals such as 314 may comprise pitch commands and yaw commands.

Figure 4:
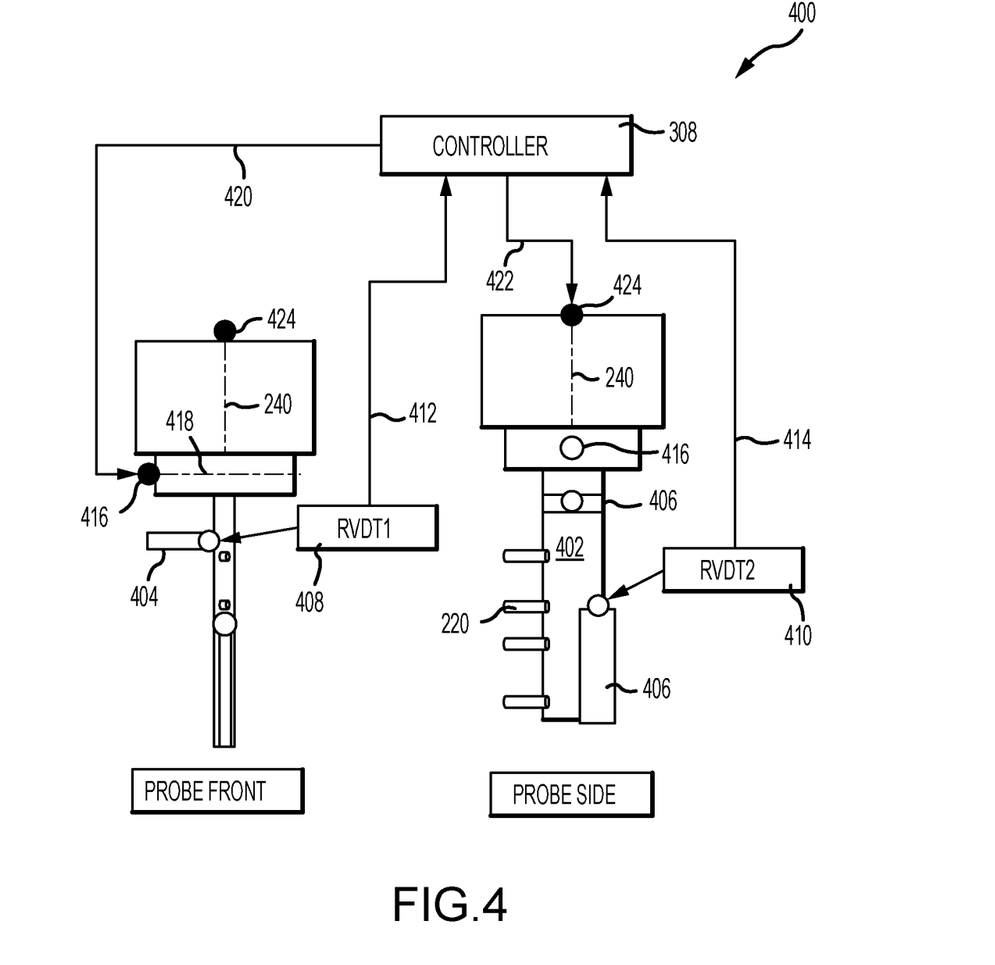
FIG. 4 illustrates a variable alignment aerodynamic probe and control system elements, in accordance with various embodiments, in accordance with various embodiments.
Figure 5:
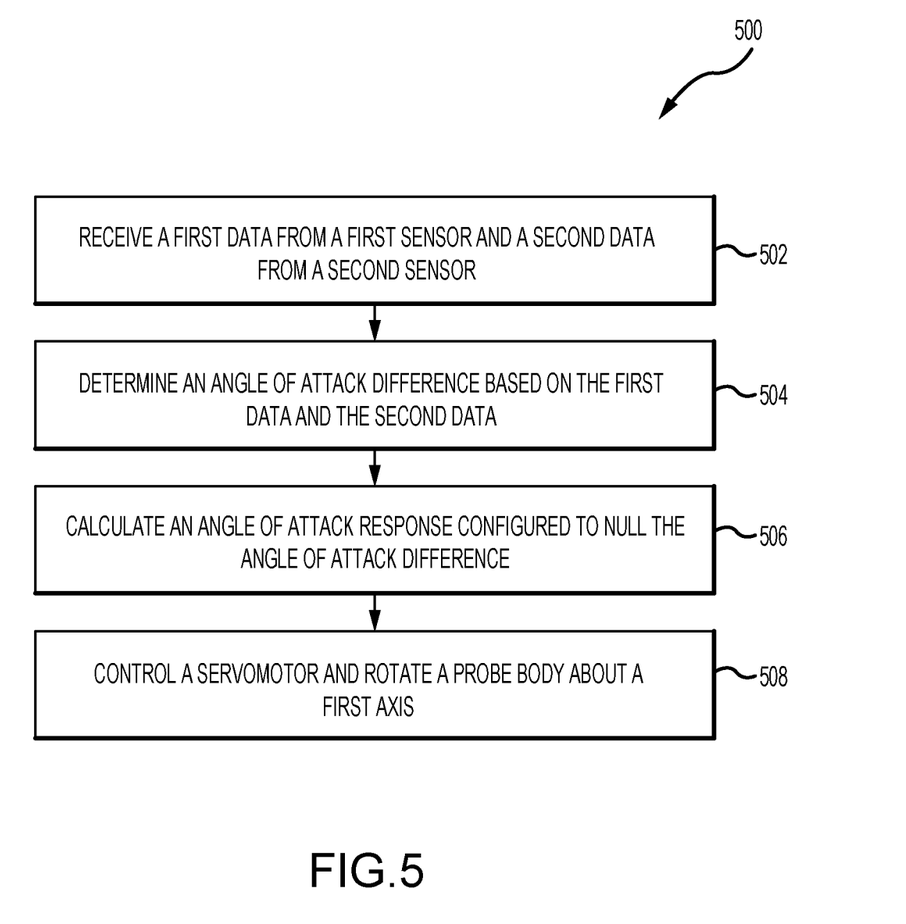
FIG. 5 illustrates a method of controlling a variable alignment aerodynamic probe, in accordance with various embodiments.

In various embodiments and with additional reference to FIG. 4, a variable alignment aerodynamic probe 400 is illustrated having features, geometries, construction, materials, manufacturing techniques, and/or internal components similar to variable alignment aerodynamic probe 300. In contrast to the single axis movement of variable alignment aerodynamic probe 300, variable alignment aerodynamic probe 400 is configured for two axis movement and comprises a probe body 402 having a yaw sensor and a pitch sensor, a pitch servomotor 416, and a yaw servomotor 424. Each of the yaw sensor, the pitch sensor, the pitch servomotor 416, and the yaw servomotor 424 are in electronic communication with the controller 308. In various embodiments, a pitch sensor may comprise a first rudder 404 coupled to a first Rotary Variable Differential Transformer (RVDT) 408 and a yaw sensor may comprise a second rudder 406 coupled to a second RVDT 410. Each RVDT be calibrated to a zero degree reference, for example the first RVDT may have a first zero degree reference normal to the leading edge of probe body 402 and the second RVDT may have a second zero degree reference parallel to the leading edge of probe body 402.

In response to turned flow 242, the first RVDT 408 may send a pitch signal 412 to controller 308 and the second RVDT 410 may send a yaw signal 414 to controller 308. Controller 308 may determine a pitch angle difference and a yaw angle difference in response to receiving pitch signal 412 and yaw signal 414. Controller 308 may calculate a pitch response as a function of the pitch angle difference and a yaw response as a function of the yaw angle difference. In various embodiments, the pitch response and/or the yaw response function may be configured to null at least one of the pitch angle difference and the yaw angle difference. Controller 308 may send a yaw command 422 based on the yaw response to a yaw servomotor 422 and probe body 402 may rotate about axis 240. Controller 308 may send a pitch command 420 based on the pitch response to pitch servomotor 416 and probe body may rotate about axis 418. In this regard, variable alignment aerodynamic probe 400 may pitch and roll to reduce the respective pitch angle of attack and yaw angle of attack with respect to turned flow 242 tending thereby to keep Kielheads 220 within the desired range to gather accurate gas-path condition information such as pressure and temperature data.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A variable alignment aerodynamic probe comprising:
    a probe body having a leading edge and extending radially into a vane case;
    a sensor element proximate the leading edge; and
    a bearing coupled to the probe body and the vane case;
    wherein the probe body is configured to rotate in response to a turned flow within the vane case,
    wherein the rotation of the probe body is configured to maintain an angle of attack of the leading edge with respect to the turned flow between 0° and 15°.

2. The variable alignment aerodynamic probe of claim 1, wherein the sensor element is at least one of a Pitot tube or Kiel probe.

3. The variable alignment aerodynamic probe of claim 2, wherein the probe body further comprises a first shaft coupled to the probe body and rigidly coupled to a first control arm.

4. The variable alignment aerodynamic probe of claim 3, wherein the first control arm is coupled to a first end of a control linkage, wherein the control linkage is coupled at a second end to a second control arm.

5. The variable alignment aerodynamic probe of claim 4, wherein the second control arm is rigidly coupled to one of a second shaft or a synchronization ring, wherein the second control arm is configured to deflect in response to rotation of a variable vane.

6. The variable alignment aerodynamic probe of claim 2, further comprising:
    a controller;
    a first sensor in electronic communication with the controller;
    a second sensor in electronic communication with the controller;
    a first servomotor in electronic communication with the controller;
    a tangible, non-transitory memory configured to communicate with the controller, the tangible, non-transitory memory having instructions stored thereon that, in response to execution by the controller, cause the controller to perform operations comprising:
    receiving, by the controller, a first data from the first sensor and a second data from the second sensor;
    determining, by the controller, a first angle of attack difference based on the first data and the second data;
    calculating, by the controller, a first angle of attack response based on the angle of attack difference, wherein the angle of attack response is configured to null the angle of attack difference; and
    controlling, by the controller, the first servomotor and, in response, rotating the probe body about a first axis.

7. The variable alignment aerodynamic probe of claim 6, further comprising a second servomotor in electronic communication with the controller, wherein the operations further comprise:
    determining, by the controller, a second angle of attack difference based on the first data and the second data;
    calculating, by the controller, a second angle of attack response based on the second angle of attack difference, wherein the second angle of attack response is configured to null the second angle of attack difference; and
    controlling, by the controller, the second servomotor and, in response, rotating the probe body about a second axis.

8. The variable alignment aerodynamic probe of claim 6, wherein the first sensor is at least one of a Pitot tube, a Kiel probe, a rotary encoder, a yaw sensor, a pitch sensor, or a Rotary Variable Differential Transformer (RVDT).

9. The variable alignment aerodynamic probe of claim 7, wherein the probe body comprises one of a yaw sensor, a pitch sensor, or an RVDT.

10. A gas turbine engine comprising:
    a fan section having a fan case;
    a compressor section having a compressor case;
    a turbine section having a turbine case; and
    a variable alignment aerodynamic probe comprising:
    a probe body having a leading edge and extending radially into a vane case;
    a sensor element proximate the leading edge; and
    a bearing coupled to the probe body and the vane case;
    wherein the probe body is configured to rotate in response to a turned flow within the vane case,
    wherein the rotation of the probe body is configured to maintain an angle of attack of the leading edge with respect to the turned flow between 0° and 15°.

11. The gas turbine engine of claim 10, wherein the sensor element is at least one of a Pitot tube or Kiel probe.

12. The gas turbine engine of claim 11, wherein the probe body further comprises a first shaft coupled to the probe body and rigidly coupled to a first control arm.

13. The gas turbine engine of claim 12, wherein the first control arm is coupled to a first end of a control linkage, wherein the control linkage is coupled at a second end to a second control arm.

14. The gas turbine engine of claim 13, wherein the second control arm is rigidly coupled to one of a second shaft or a synchronization ring, wherein the second control arm is configured to deflect in response to rotation of a variable vane.

15. The gas turbine engine of claim 11, further comprising:
    a controller;
    a first sensor in electronic communication with the controller;
    a second sensor in electronic communication with the controller;
    a first servomotor in electronic communication with the controller;
    a tangible, non-transitory memory configured to communicate with the controller, the tangible, non-transitory memory having instructions stored thereon that, in response to execution by the controller, cause the controller to perform operations comprising:
    receiving, by the controller, a first data from the first sensor and a second data from the second sensor;
    determining, by the controller, a first angle of attack difference based on the first data and the second data;

calculating, by the controller, a first angle of attack response based on the angle of attack difference, wherein the angle of attack response is configured to null the angle of attack difference; and controlling, by the controller, the first servomotor and, in response, rotating the probe body about a first axis.

16. The gas turbine engine of claim 15, further comprising a second servomotor in electronic communication with the controller, wherein the operations further comprise:

determining, by the controller, a second angle of attack difference based on the first data and the second data;

calculating, by the controller, a second angle of attack response based on the second angle of attack difference, wherein the second angle of attack response is configured to null the second angle of attack difference; and controlling, by the controller, the second servomotor and, in response, rotating the probe body about a second axis.

17. The gas turbine engine of claim 15, wherein the first sensor is at least one of a Pitot tube, a Kiel probe, a rotary encoder, a yaw sensor, a pitch sensor, or a Rotary Variable Differential Transformer (RVDT).

18. The gas turbine engine of claim 16, wherein the probe body comprises one of a yaw sensor, a pitch sensor, or an RVDT.

19. An article of manufacture including a tangible, non-transitory computer-readable storage medium having instructions stored thereon that, in response to execution by a processor, cause the processor to perform operations comprising:

receiving, by the processor, a first data from a first sensor and a second data from a second sensor;

determining, by the processor, a first angle of attack difference based on the first data and the second data;

calculating, by the processor, a first angle of attack response based on the angle of attack difference, wherein the angle of attack response is configured to null the angle of attack difference; and controlling, by the processor, a first servomotor and, in response, rotating a probe body about a first axis.

20. The article of manufacture of claim 19, further comprising the operations of:

determining, by the processor, a second angle of attack difference based on the first data and the second data;

calculating, by the processor, a second angle of attack response based on the second angle of attack difference, wherein the second angle of attack response is configured to null the second angle of attack difference; and controlling, by the processor, a second servomotor and, in response, rotating the probe body about a second axis.

* * * * *